(12) United States Patent
Hamamoto et al.

(10) Patent No.: US 9,167,661 B2
(45) Date of Patent: Oct. 20, 2015

(54) POWER SUPPLY DEVICE AND LIGHTING DEVICE AND LIGHTING FIXTURE USING THE SAME

(71) Applicant: Panasonic Corporation, Osaka (JP)

(72) Inventors: Katsunobu Hamamoto, Osaka (JP); Masafumi Yamamoto, Hyogo (JP); Hiroyuki Asano, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 447 days.

(21) Appl. No.: 13/731,158

(22) Filed: Dec. 31, 2012

(65) Prior Publication Data

US 2013/0207563 A1    Aug. 15, 2013

(30) Foreign Application Priority Data

Feb. 13, 2012    (JP) .................. 2012-028051

(51) Int. Cl.
| | |
|---|---|
| *H05B 41/36* | (2006.01) |
| *H05B 37/02* | (2006.01) |
| *G05F 1/46* | (2006.01) |
| *H02M 3/156* | (2006.01) |
| *H05B 33/08* | (2006.01) |

(52) U.S. Cl.
CPC .............. *H05B 37/02* (2013.01); *G05F 1/468* (2013.01); *H02M 3/156* (2013.01); *H05B 33/0815* (2013.01); *Y02B 20/346* (2013.01); *Y02B 20/383* (2013.01)

(58) Field of Classification Search
CPC .............. H02M 3/156; H02M 1/4225; H02M 2001/0032; H02M 1/08; H02M 1/083; H02M 1/32; H02M 1/36; H02M 2001/0009; H02M 2001/0025; H02M 2001/0058; H02M 3/00; H02M 3/28; H02M 3/285; H02M 3/335
See application file for complete search history.

(56) References Cited

U.S. PATENT DOCUMENTS

| | | | | |
|---|---|---|---|---|
| 2010/0002480 | A1* | 1/2010 | Huynh et al. | ............. 363/90 |
| 2010/0156491 | A1* | 6/2010 | Kuan | ............. 327/172 |
| 2011/0216565 | A1 | 9/2011 | Mi et al. | |
| 2012/0062190 | A1* | 3/2012 | Haiplik et al. | ............. 323/271 |
| 2012/0153921 | A1* | 6/2012 | Brokaw | ............. 323/288 |

(Continued)

FOREIGN PATENT DOCUMENTS

| | | |
|---|---|---|
| CN | 101404446 A | 4/2009 |
| CN | 201667742 U | 12/2010 |
| EP | 2 268 109 A2 | 12/2010 |

(Continued)

*Primary Examiner* — Douglas W Owens
*Assistant Examiner* — Monica C King
(74) *Attorney, Agent, or Firm* — Renner, Otto, Boisselle & Sklar, LLP

(57) ABSTRACT

A power supply device comprises: a DC power supply section that outputs a DC voltage; a voltage conversion section that supplies a DC power to a load by ON/OFF drive of a switching element; a resistor; a control section that performs the ON/OFF drive of the switching element; and an auxiliary winding. The control section comprises: a calculation section that calculates a drive period of the switching element; a count section compares a calculation result obtained in the calculation section with an upper limit value of the drive period; and a flip-flop. When the calculation result is shorter than the upper limit value, the flip-flop sets the drive period, using the calculation result. When the calculation result is longer than the upper limit value, the flip-flop sets the drive period, using the upper limit value.

6 Claims, 9 Drawing Sheets

(56) References Cited

U.S. PATENT DOCUMENTS

2012/0155127 A1* 6/2012 Brokaw .................. 363/49
2012/0169240 A1* 7/2012 Macfarlane ............. 315/152

FOREIGN PATENT DOCUMENTS

EP          2 326 148 A2    5/2011
JP          2009-240114 A   10/2009

* cited by examiner

POWER SUPPLY DEVICE AND LIGHTING DEVICE AND LIGHTING FIXTURE USING THE SAME

BACKGROUND OF THE INVENTION

1. Field of the Invention

The invention relates to a power supply device, and a lighting device and a lighting fixture using the same.

2. Description of the Related Art

In power supply devices used for various purposes including illumination, a chopper control method is generally known as a control method for taking out the required power. By using the chopper control method, the power supply devices have relatively little energy loss. Then, control circuit, which can achieve the chopper control method comparatively easily, is made as an integrated circuit and is commercially available from various manufacturers.

In the chopper control, turning on and off a current is repeated with high frequency, and desired electric power can be obtained. Then, a control for making an output voltage higher than an input voltage is called a boost chopper control, and a control for making an output voltage lower than an input voltage is called a step-down chopper control.

In regard to operating modes of the chopper control, there are a continuous mode, a critical mode and an intermittent (discontinuous) mode which are categorized according to whether a current that flows through an inductor constituting a chopper control circuit is continuous or intermittent. Each operating mode has advantages and disadvantages. The continuous mode is generally suitable for use in a device for outputting high electrical power, and high noise is generated from a switching element constituting the chopper control circuit, and an inductance value of the inductor also becomes large. As a result, the continuous mode has a feature that the inductor easily increases in size. The critical mode and the intermittent mode are suitable for use in a device for outputting low electrical power, and relatively-low noise is generated from the switching element, and the inductor can be reduced relatively in size. Furthermore, it is known that these two modes have relatively high efficiency compared with the continuous mode. In regard to a difference between the critical mode and the intermittent mode, when the same electric energy is taken out, the intermittent mode has a tendency to have a peak value of a switching current higher than the critical mode. Then, the intermittent mode has a feature that a ripple component of a switching period is generated easily in an outputted voltage waveform.

Further, there has been a power supply device which performs the step-down chopper control so that an output voltage becomes constant and operates to switch between the continuous mode and the critical mode (for example, see Japanese Patent Application Laid-Open No. 2009-240114). The power supply device operates in the continuous mode when supplying high electrical power, and operates in the critical mode when supplying low electrical power.

First, the critical mode is explained using FIGS. 10A and 10B. FIG. 10A is a waveform chart of a current flowing through a switching element. FIG. 10B is a waveform chart of an inductor current flowing through an inductor.

When the switching element is turned on, the inductor current is increased along a slope that is determined by an inductance value of the inductor, and energy is stored in the inductor. Then, after the elapse of an ON period Ton1 that is set previously in a control circuit, the switching element is turned off so that a detected supply voltage becomes a desired voltage. At this time, the energy stored in the inductor is supplied to an output side via a smoothing capacitor, and an average current Iout1 is outputted.

When all of the energy stored in the inductor is supplied, a polarity of a voltage generated in an auxiliary winding of the inductor is reversed. The control circuit detects the voltage polarity reversal generated in the auxiliary winding, and the switching element is turned on again with a timing of when the control circuit detects the voltage polarity reversal. Thereby, the power supply device operates in the critical mode.

Next, the continuous mode is explained using FIGS. 11A and 11B. FIG. 11A is a waveform chart of a current flowing through the switching element. FIG. 11B is a waveform chart of an inductor current flowing through the inductor.

When a supply power is high, an ON period of the switching element is lengthened so that a detected supply voltage becomes a constant voltage. The ON period becomes Ton2 (>Ton1). The inductor current is increased along a slope that is determined by an inductance value of the inductor, like the case where the supply power is low.

When the switching element is turned off after the elapse of the ON period Ton2, energy stored in the inductor is supplied to an output side, and an average current Iout2 is outputted. In this case, a voltage generated in an auxiliary winding of the inductor is inputted to a timer circuit. In the timer circuit, an upper limit value Toff1 of an OFF period is set. When time that has elapsed since the switching element is turned off exceeds the upper limit value Toff1, the switching element is turned on before the polarity reversal of the voltage is generated in the auxiliary winding. Thereby, the power supply device operates in the continuous mode.

That is, when the supply power is increased gradually, the OFF period of the switching element that is controlled in the critical mode is lengthened gradually. Therefore, when the time exceeds the upper limit value Toff1 set in the timer circuit, the OFF period of the switching element is fixed at the upper limit value Toff1.

Here, when the abovementioned power supply device operates in the continuous mode, the OFF period of the switching element is fixed at the upper limit value Toff1, but the ON period is not fixed. As a result, when the supply power is increased, the ON period is lengthened and then a drive period of the switching element is also lengthened. In other words, a drive frequency of the switching element is reduced. Then, the drive frequency is reduced to a zone of audibility, and therefore, there is a possibility that noise is generated or the drive frequency interferes in a frequency used in an infrared remote control.

SUMMARY OF THE INVENTION

It is an object of the present invention to provide a power supply device which can prevent a drive period of a switching element from exceeding an upper limit value when a supply power is increased or decreased, and a lighting device and a lighting fixture using the same.

A power supply device of the present invention comprises: a DC power supply section that outputs a DC voltage; a voltage conversion section that is provided with a switching element, an inductor and a capacitor, and supplies a DC power to a load by ON/OFF drive of the switching element, using the DC power supply section as an input power source; a current detection section that detects a current flowing through the load; a control section that performs the ON/OFF drive of the switching element based on a detection result obtained in the current detection section so that a DC electricity supplied from the voltage conversion section to the load is maintained constant; and an energy detection section that detects energy which is released by the inductor, wherein the control section comprises a calculation section that calculates a drive period of the switching element according to increase or decrease of the DC power supplied to the load, and a period comparator that compares a calculation result obtained in the calculation section with an upper limit value of the drive period of the switching element, wherein when the drive period of the switching element calculated by the calculation section is shorter than the upper limit value, the control section is configured to set the drive period of the switching element, using the calculation result obtained in the calculation section, and to turn on the switching element with a timing of when the energy released by the inductor is reduced to zero, and wherein when the drive period of the switching element calculated by the calculation section is longer than the upper limit value, the control section is configured to set the drive period of the switching element, using the upper limit value.

In the power supply device, it is preferred that the calculation result obtained in the calculation section is adjusted so that the drive period of the switching element is lengthened with decreasing the DC power supplied to the load.

A lighting device of the present invention comprises: any one of the abovementioned power supply devices; and a load to which the power supply device supplies a DC power, wherein the load comprises a plurality of light-emitting diodes which are connected in series or parallel, and is provided with a connecting portion which is detachably attached to an output terminal of the power supply device, and lights up by receiving the DC power from the power supply device.

A lighting fixture of the present invention comprises: the above-mentioned lighting device; and a main body to which the lighting device is attached.

As explained above, the present invention has the effect of preventing a drive period of a switching element from exceeding an upper limit value when a supply power is increased or decreased.

BRIEF DESCRIPTION OF THE DRAWINGS

Preferred embodiments of the invention will now be described in further details. Other features and advantages of the present invention will become better understood with regard to the following detailed description and accompanying drawings where.

DETAILED DESCRIPTION OF EXEMPLARY EMBODIMENTS

Hereinafter, Embodiments of the present invention will be explained based on Figures.

(Embodiment 1)

Figure 1:
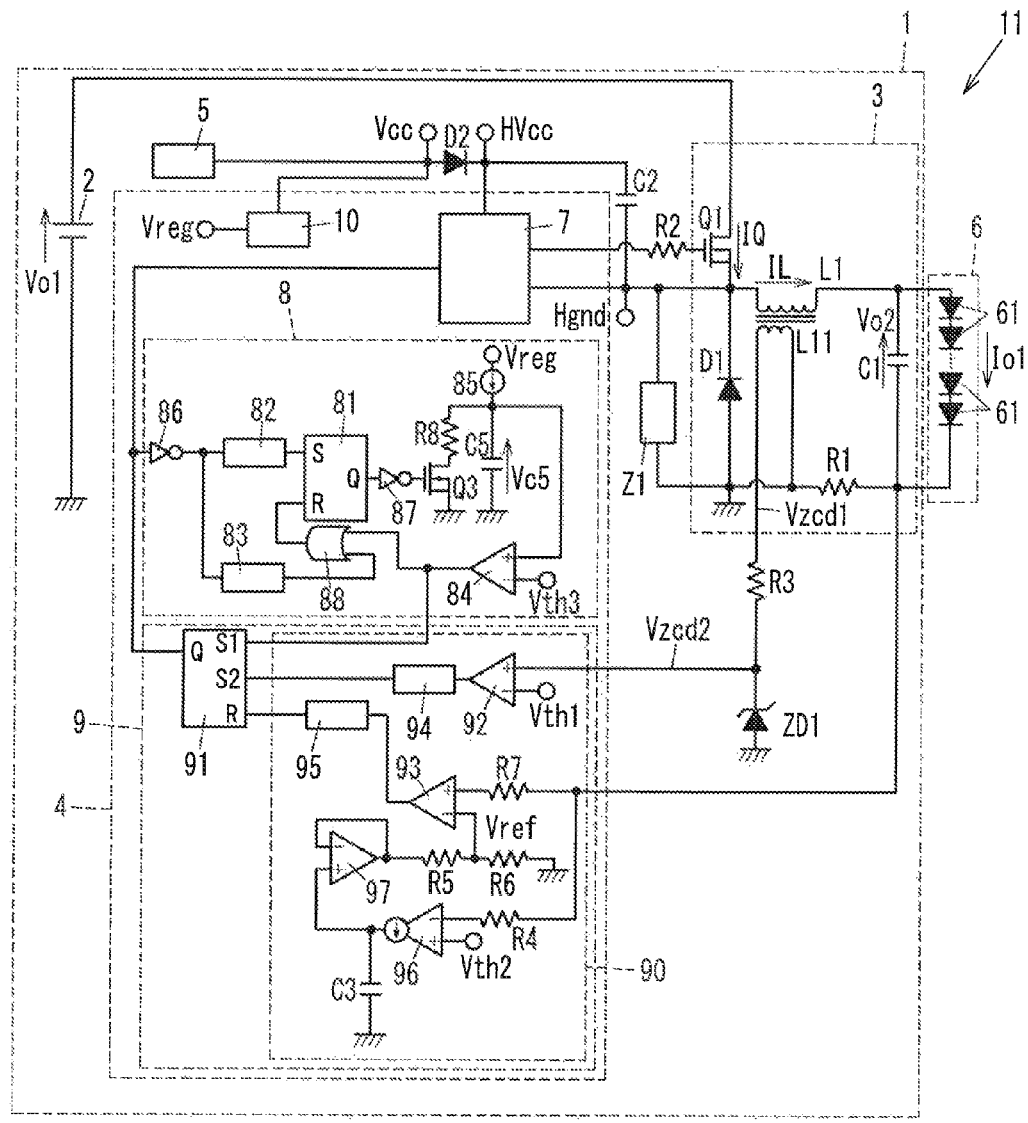
FIG. 1 is a circuit configuration diagram of a power supply device according to Embodiment 1 of the present invention.

FIG. 1 shows a circuit configuration of a power supply device 1 according to the present embodiment.

The power supply device 1 includes a DC power supply section 2, a voltage conversion section 3, a control section 4 and a control power supply section 5. The power supply device 1 supplies a DC power to a load 6. First, the configuration of each section in the power supply device 1 will be explained.

The DC power supply section 2 generates a rectified and smoothed DC voltage Vo1, using a power supply voltage supplied from the outside of the power supply device 1. Then, the DC power supply section 2 outputs the DC voltage Vo1 to the subsequent voltage conversion section 3. As long as the DC power supply section 2 is configured to output the DC voltage Vo1 to the voltage conversion section 3, the DC power supply section 2 can also have other configuration. For example, the DC power supply section 2 may include a boost chopper circuit that generates the DC voltage Vo1 by boosting an input voltage.

The voltage conversion section 3 includes a switching element Q1, an inductor L1, a smoothing capacitor C1, a diode D1 and a resistor R1. Then, the switching element Q1, inductor L1, smoothing capacitor C1 and diode D1 constitute a step-down chopper circuit. The step-down chopper circuit supplies a constant DC electricity Io1 to the load 6 by ON/OFF drive of the switching element Q1, using the DC power supply section 2 as an input power source. Specifically, a series circuit of the switching element Q1, inductor L1, smoothing capacitor C1 and resistor R1 is connected between output terminals of the DC power supply section 2. Further, a series circuit of the inductor L1, smoothing capacitor C1 and resistor R1 is connected in parallel to the diode D1. The switching element Q1 is constituted by an N-channel MOSFET, and its gate is connected to the control section 4 through a resistor R2. Then, ON/OFF drive of the switching element Q1 is performed by the control section 4, and thereby the DC voltage Vo1 is stepped down. Then, a DC voltage Vo1 is generated across the smoothing capacitor C1 by stepping down the DC voltage Vo1, and the DC electricity Io1 obtained by averaging an inductor current IL flowing through the inductor L1 is supplied to the load 6.

The load 6 includes a plurality of light-emitting diodes 61 which are connected in series. The load 6 is connected in parallel to the smoothing capacitor C1, and the DC voltage Vo1 is applied to the load 6. In the present embodiment, the DC electricity Io1 is controlled to be supplied to the load 6 with a predetermined value. Therefore, the DC voltage Vo1 generated in the voltage conversion section 3 changes in response to the load 6. For example, when the number of light-emitting diodes 61 in the load 6 is large, the DC voltage Vo1 changes to a high value. In contrast, when the number of light-emitting diodes 61 is small, the DC voltage Vo1 changes to a low value. The light-emitting diodes 61 in the load 6 of the present embodiment are connected in series, but may be connected in parallel.

The resistor R1 is connected in series to the smoothing capacitor C1, and functions as a current detection section that detects the inductor current IL. Then, a detection voltage Vd (a voltage generated across the resistor R1) proportional to the inductor current IL is outputted to the control section 4.

When the switching element Q1 is turned on, the inductor current IL is increased along a slope that is determined by an inductance La of the inductor L1, and energy is stored in the inductor L1. When the switching element Q1 is turned off, the stored energy is released and supplied to the load 6 through the smoothing capacitor C1. The inductor L1 is provided with an auxiliary winding L11. The auxiliary winding L11 functions as an energy detection section that detects the energy which is released by the inductor L1. One end of the auxiliary winding L11 is connected to ground, and becomes a high voltage side when the inductor current IL is increased. The other end of the auxiliary winding L11 is connected to ground via a series circuit of a resistor R3 and a zener diode ZD1. Then, an induction voltage Vzcd1 is generated in the auxiliary winding L11 by the inductor current IL. When the energy stored in the inductor L1 is reduced to zero, that is, the inductor current IL is reduced to zero, the polarity reversion in the induction voltage Vzcd1 occurs. Then, the induction voltage Vzcd1 is clamped by the zener diode ZD1, and is outputted to the control section 4 as an induction voltage Vzcd2.

The control power supply section 5 generates a control power Vcc that is used as the power for operating the control section 4, to supply to the control section 4. When the voltage conversion section 3 is stopping, that is, before the voltage conversion section 3 is activated, there is a risk that the source side potential in the switching element Q1 is not reduced to almost zero [V]. So, in order to activate certainly the voltage conversion section 3 upon turning on the switching element Q1, a series circuit of diode D2, a capacitor C2 and an impedance element Z1 is inserted between ground and an output terminal of the control power supply section 5. The impedance element Z1 is constituted by a component, such as a resistor, that has galvanic impedance. One end of the impedance element Z1 is connected to one end of the capacitor C2 and the source of the switching element Q1, and the other end of the impedance element Z1 is connected to ground. As a result, even when the voltage conversion section 3 is stopping, the current flows from the control power supply section 5 through a path that is followed by the diode D2, the capacitor C2 and the impedance element Z1 in that order, and the capacitor C2 can be charged. When a reference potential in one end of the capacitor C2 (the source of the switching element Q1) is set to Hgnd, a control power HVcc is generated across the capacitor C2 and is supplied to the control section 4. The control section 4 performs ON/OFF drive of the switching element Q1, using this control power HVcc. In this way, even when the voltage conversion section 3 is stopping, the control power HVcc can be secured and the voltage conversion section 3 can be activated certainly.

The control section 4 includes a drive section 7, a count section 8, a signal generation section 9 and a reference supply section 10. The control section 4 performs ON/OFF drive of the switching element Q1 so that the DC electricity Io1 supplied form the voltage conversion section 3 to the load 6 is maintained constant, and then allows the voltage conversion section 3 to operate in the critical mode or the continuous mode. The reference supply section 10 generates, from the control power Vcc, a reference power Vreg that is used for an internal power supply of the control section 4. The signal generation section 9 outputs, to the drive section 7, a control signal S1 that includes a timing of when the switching element Q1 is turned on and off. The drive section 7 is constituted by a high side drive circuit, and generates a drive signal for performing ON/OFF drive of the switching element Q1, based on the control signal S1 outputted from the signal generation section 9. The count section 8 counts a period (a drive period T of the switching element Q1) of the control signal S1 outputted from the signal generation section 9, and compares the drive period T with an upper limit value Tmax of the drive period T that has been set. Hereinafter, the configuration of each section will be explained.

The signal generation section 9 includes a calculation section 90 and a R-S flip-flop 91. The calculation section 90 includes comparators 92, 93, a pulse generator 94, a time-delay section 95, an error amplifier 96, an operational amplifier 97, resistors R4-R7 and a capacitor C3.

The calculation section 90 determines a timing of when the switching element Q1 is turned on and off in the case where the voltage conversion section 3 operates in the critical mode. That is, the calculation section 90 determines the drive period T of the switching element Q1. The configuration of the calculation section 90 will be explained below.

A non-inverting input terminal of the comparator 92 is connected to a connection point located between the resistor R3 and the zener diode ZD1, and the induction voltage Vzcd2 is inputted. An inverting input terminal of the comparator 92 is connected to a voltage generator (not shown), and a predetermined threshold voltage Vth1 is inputted. An output terminal of the comparator 92 is connected to the pulse generator 94, and then outputs a comparison result obtained by comparing the induction voltage Vzcd2 with the threshold voltage Vth1.

The pulse generator 94 generates a pulse signal P1 having a pulse width Tos1 (High level period) with a fall timing of the inputted signal (a signal outputted from the comparator 92), and outputs it to a S2 terminal (a second set terminal) of the flip-flop 91.

An inverting input terminal of the error amplifier 96 is connected to one end of the resistor R1 (a connection point located between the resistor R1 and the capacitor C1) via the resistor R4, and the detection voltage Vd is inputted. A non-inverting input terminal of the error amplifier 96 is connected to a voltage generator (not shown), and a predetermined threshold voltage Vth2 is inputted. An output terminal side of the error amplifier 96 is configured to be capable of sinking or sourcing a constant current, based on a comparison result obtained by comparing the detection voltage Vd with the threshold voltage Vth2. The capacitor C3 is connected between ground and an output terminal of the error amplifier 96. When the detection voltage Vd is higher than the threshold voltage Vth2, the error amplifier 96 sinks the constant current. When the detection voltage Vd is lower than the threshold voltage Vth2, the error amplifier 96 sources the constant current. Therefore, a voltage across the capacitor C3 changes in response to the level of the detection voltage Vd. In order to obtain the stable operation, it is preferred that the capacitor C3 having a sufficiently-large capacity is used, thereby reducing a ripple voltage in a waveform of the voltage across the capacitor C3.

The connection point located between the error amplifier 96 and the capacitor C3 is connected to the operational amplifier 97. A non-inverting input terminal of the operational amplifier 97 is connected to the capacitor C3. An inverting input terminal and an output terminal of the operational amplifier 97 are connected to each other. That is, the operational amplifier 97 functions as a buffer. A series circuit of resistors R5 and R6 is connected between ground and the output terminal of the operational amplifier 97. A connection point located between the resistors R5 and R6 is connected to an inverting input terminal of the comparator 93. Therefore, a voltage across the capacitor C3 is divided by the resistors R5 and R6 via the buffer (the operational amplifier 97), thereby being converted to a reference voltage Vref. Then, the reference voltage Vref is applied to the inverting input terminal of the comparator 93.

A non-inverting input terminal of the comparator 93 is connected to one end of the resistor R1 (the connection point between the resistor R1 and capacitor C1) via the resistor R7, and the detection voltage Vd is inputted. An output terminal of the comparator 93 is connected to an R terminal (a reset terminal) of the flip-flop 91 via the time-delay section 95, and then a comparison result obtained by comparing the detection voltage Vd with the reference voltage Vref is outputted.

The time-delay section 95 is configured to delay a timing of when an output signal outputted from the comparator 93 is transmitted to the flip-flop 91. Specifically, the time-delay section 95 outputs the output signal to the flip-flop 91 with delaying only a timing of when an output level in the comparator 93 changes from Low level to High level. In contrast, the time-delay section 95 outputs the output signal to the flip-flop 91 without delaying a timing of when the output level in the comparator 93 changes from High level to Low level. In order to achieve this function, the time-delay section 95 of the present embodiment has the circuit configuration as shown in FIG. 2.

Figure 2:
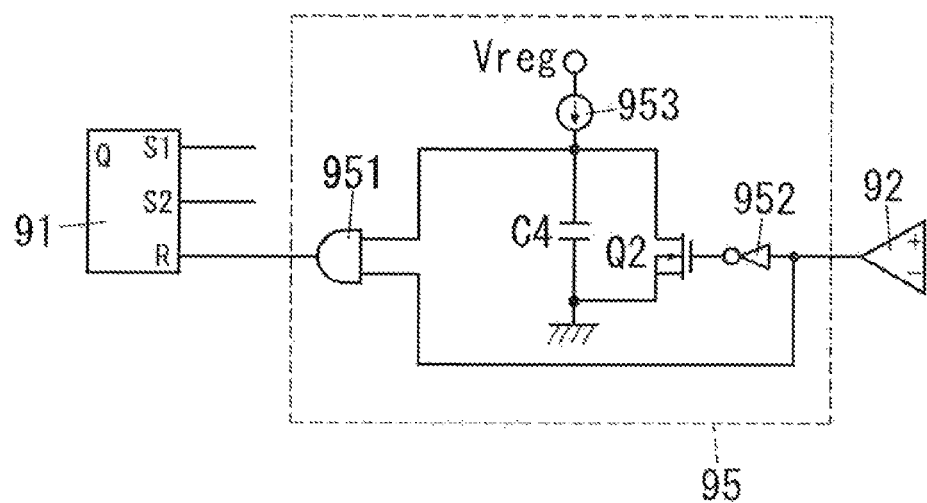
FIG. 2 is a circuit configuration diagram of a time-delay section in the power supply device according to the Embodiment 1 of the present invention.

As shown in FIG. 2, time-delay section 95 includes an AND element 951, an INV element 952, a constant current source 953, a capacitor C4 and a switching element Q2. The constant current source 953 supplies a constant current to the capacitor C4, using a reference supply Vreg outputted from the reference supply section 10 as an input power source. The switching element Q2 is constituted by an N-channel MOSFET, and is connected in parallel to the capacitor C4. Then, a gate terminal of the switching element Q2 is connected to the output terminal of the comparator 92 via the INV element 952. One input terminal of the AND element 951 is connected to the capacitor C4, and thereby a voltage across capacitor C4 is inputted. The other input terminal of the AND element 951 is connected to the output terminal of the comparator 92. An output terminal of the AND element 951 is connected to the R terminal of the flip-flop 91.

In the time-delay section 95 having the above configuration, when the output level in the comparator 92 is Low level and the switching element Q2 is turned on, short circuit is generated across the capacitor C4 and an output level in the AND element 951 is changed to Low level. Then, when the output level in the comparator 92 changes from Low level to High level, the switching element Q2 is turned off, and a voltage across the capacitor C4 is increased through the constant current supplied from the constant current source 953. Then, when the voltage across the capacitor C4 exceeds a threshold value, the output level in the AND element 951 is changed to High level. That is, a delay time Td1 is a period from the time when the output level in the comparator 92 changes from Low level to High level to the time when the voltage across the capacitor C4 reaches the threshold value. In such a configuration, the time-delay section 95 outputs an output signal S2 to the flip-flop 91 with delaying only the timing of when the output level in the comparator 93 changes from Low level to High level. Further, the delay time Td1 can be changed by adjusting a current value outputted from the constant current source 953, the capacity of the capacitor C4, or the threshold value that is compared with the voltage across the capacitor C4.

In the abovementioned configuration, the comparator 92 compares the induction voltage Vzcd2 with the threshold voltage Vth1. Thereby, the calculation section 90 determines whether or not the energy released by the inductor L1 is zero. Then, the calculation section 90 determines the timing of when the switching element Q1 is turned on. Further, the comparator 93 compares the detection voltage Vd with the reference voltage Vref. Thereby, the calculation section 90 determines the timing of when the switching element Q1 is turned off. That is, the calculation section 90 calculates the drive period T of the switching element Q1 in the case where the voltage conversion section 3 operates in the critical mode.

Further, the reference voltage Vref used for determining the timing of when the switching element Q1 is turned off is determined through the comparison result (a voltage across the capacitor C3) obtained by comparing the detection voltage Vd with the predetermined threshold voltage Vth2. Thereby, the DC electricity Io1 supplied from the voltage conversion section 3 to the load 6 is controlled to be maintained constant.

Further, when the voltage conversion section 3 operates in the critical mode, the flip-flop 91 generates the control signal S1 with the on/off timing of the switching element Q1 determined by the calculation section 90. Then, a Q terminal (an output terminal) of the flip-flop 91 is connected to the drive section 7. The flip-flop 91 outputs, to the drive section 7, the control signal S1 that includes the timing for performing ON/OFF drive of the switching element Q1.

The drive section 7 is connected to the gate of the switching element Q1 via the resistor R2. The drive section 7 generates a drive signal that synchronizes with the control signal S1 outputted from the flip-flop 91, using the control power HVcc. Then, the drive section 7 outputs the drive signal to the switching element Q1, thereby performing the ON/OFF drive of the switching element Q1. Specifically, when the control signal S1 outputted from the flip-flop 91 is High level, the switching element Q1 is turned on. When the control signal S1 is Low level, the switching element Q1 is turned off.

The count section 8 (a period comparator) includes a R-S flip-flop 81, pulse generators 82, 83, a comparator 84, a constant current source 85, INV elements 86, 87, an OR element 88, a switching element Q3, a resistor R8 and a capacitor C5. An upper limit value Tmax of the drive period T of the switching element Q1 is set in the count section 8. The count section 8 compares the upper limit value Tmax with the drive period T that has been calculated in the calculation section 90.

An input terminal of the INV element 86 is connected to a Q terminal of the flip-flop 91, and an output terminal of the INV element 86 is connected to the pulse generators 82, 83. The INV element 86 inverts the control signal S1 that has been outputted from the flip-flop 91, and then outputs, to the pulse generators 82, 83, the inverted signal.

The pulse generator 82 generates a pulse signal P2 having a pulse width Tos2 (High level period) with a fall timing of an inputted signal (the signal outputted from the INV element 86), that is, with a timing of when the switching element Q1 is turned on. Further, an output terminal of the pulse generator 82 is connected to an S terminal (a set terminal) of the flip-flop 81 to output the generated pulse signal P2.

The pulse generator 83 generates a pulse signal P3 having a pulse width Tos3 (High level period) with a fall timing of the inputted signal (the signal outputted from the INV element 86), that is, with a timing of when the switching element Q1 is turned on. In addition, the pulse width Tos3 of the pulse signal P3 generated by the pulse generator 83 is set so as to be shorter than the pulse width Tos2 of the pulse signal P2 generated by the pulse generator 82. An output terminal of the pulse generator 83 is connected to an R terminal (a reset terminal) of the flip-flop 81 via the OR element 88. The pulse generator 83 outputs, to the R terminal, the pulse signal P2 via the OR element 88.

Then, a Q terminal (an output terminal) of flip-flop 81 is connected to a gate of the switching element Q3, constituted by an N-channel MOSFET, via the INV element 87 to output an output signal S3.

The constant current source 85 supplies a constant current to the capacitor C5, using the reference supply Vreg outputted from the reference supply section 10 as an input power source. A series circuit of the switching element Q3 and the resistor R4 is connected in parallel to the capacitor C5.

A non-inverting input terminal of the comparator 84 is connected to one terminal of the capacitor C5, and a voltage across the capacitor C5 (a capacitor voltage Vc5) is inputted. Then, an inverting input terminal of the comparator 84 is connected to a voltage generator (not shown), and a predetermined threshold voltage Vth3 is inputted. An output terminal of the comparator 84 is connected to a S1 terminal (a first set terminal) of the flip-flop 91, and further is connected to the R terminal of the flip-flop 81 via the OR element 88. The comparator 84 outputs, to the S1 terminal of the flip-flop 91 and the R terminal of the flip-flop 81, the output signal S3 based on a comparison result obtained by comparing the capacitor voltage Vc5 with the threshold voltage Vth3.

In the above configuration of the count section 8, when the switching element Q1 is turned on (when the control signal S1 outputted from the flip-flop 91 is High level), the switching element Q3 is turned off, and the capacitor voltage Vc5 starts rising. A period till when the capacitor voltage Vc5 reaches the threshold voltage Vth3 is the upper limit value Tmax of the drive period T. That is, the count section 8 compares a period from the time when the switching element Q1 is turned on to the time when the switching element Q1 is turned on next (the drive period T that has been calculated by the calculation section 90) with the period till when the capacitor voltage Vc5 reaches the threshold voltage Vth3 (the upper limit value Tmax of the drive period T). Then, when the drive period T that has been calculated by the calculation section 90 is shorter than the upper limit value Tmax, an output level in the comparator 84 is changed to Low level. When the drive period T that has been calculated by the calculation section 90 is longer than the upper limit value Tmax, the output level in the comparator 84 is changed to High level.

Figure 3:
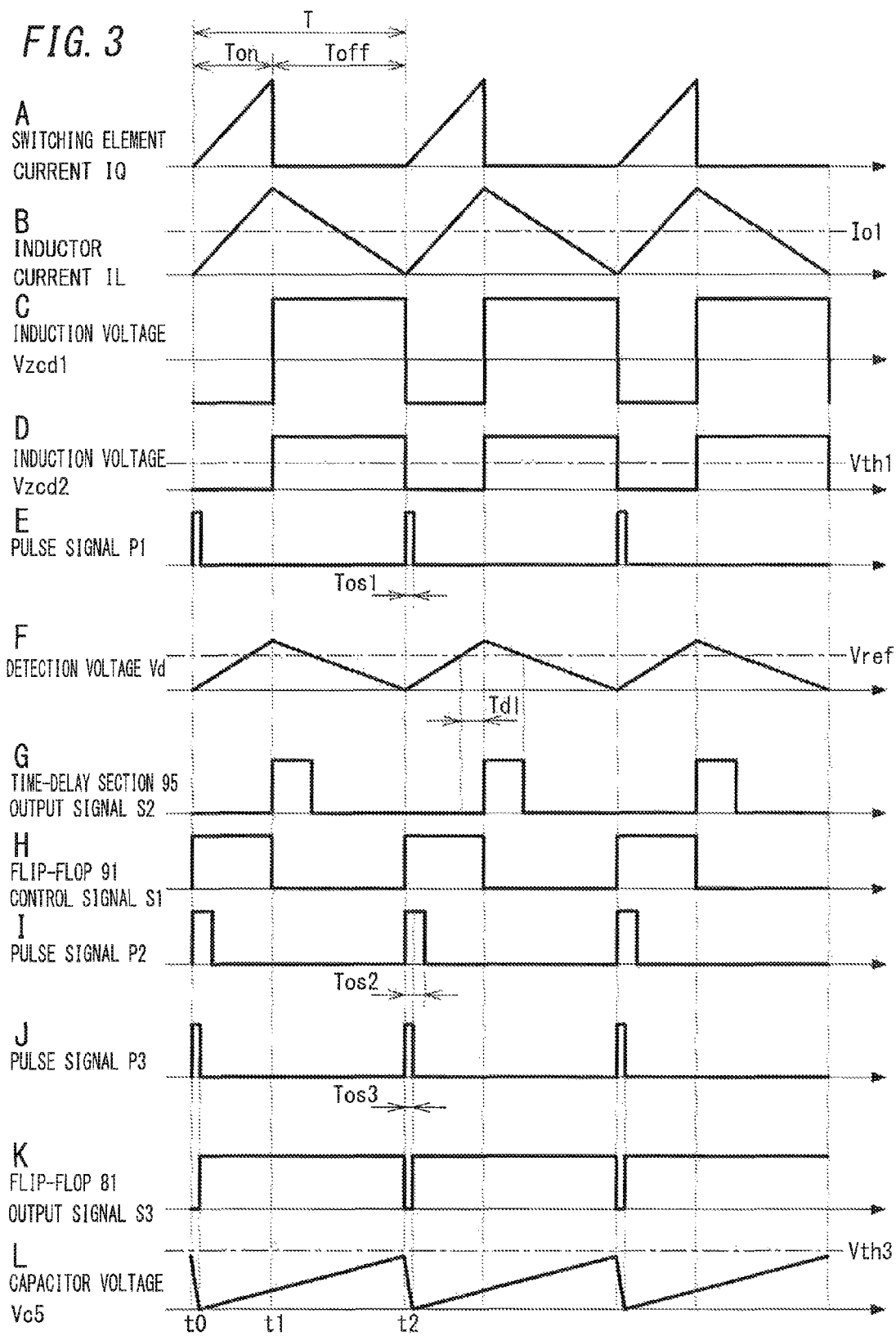
FIGS. 3A to 3L are timing diagrams upon a critical mode in the power supply device according to the Embodiment 1 of the present invention.

Then, the operation of the power supply device 1 according to the present embodiment will be explained. First, the case where the voltage conversion section 3 operates in the critical mode will be explained, using timing diagrams shown in FIGS. 3A-3L. FIG. 3A is a waveform chart of a switching element current IQ flowing through the switching element Q1. FIG. 3B is a waveform chart of an inductor current IL flowing through the inductor L1. FIG. 3C is a waveform chart of the induction voltage Vzcd1 induced in the auxiliary winding L11. FIG. 3D is a waveform chart of the induction voltage Vzcd2 inputted to the non-inverting input terminal of the comparator 92. FIG. 3E is a waveform chart of the pulse signal P1 outputted from the pulse generator 94. FIG. 3F is a waveform chart of the detection voltage Vd inputted to the non-inverting input terminal of the comparator 93. FIG. 3G is a waveform chart of the output signal S2 outputted from the time-delay section 95. FIG. 3H is a waveform chart of the control signal S1 outputted from the flip-flop 91. FIG. 3I is a waveform chart of the pulse signal P2 outputted from the pulse generator 82. FIG. 3J is a waveform chart of the pulse signal P3 outputted from the pulse generator 83. FIG. 3K is a waveform chart of the output signal S3 outputted from the flip-flop 81. FIG. 3L is a waveform chart of the capacitor voltage Vc5 inputted to the non-inverting input terminal of the comparator 84.

First, the operation in the case where the switching element Q1 is turned off (an OFF period Toff) will be explained. When the switching element Q1 is turned off at a time t1, a regenerative current (the inductor current IL) starts flowing via the diode D1 due to the energy that has been stored in the inductor L1. The regenerative current is decreased with time, and is reduced to zero at a time t2 (see FIG. 3B). At this time, the polarity reversion of the induction voltage Vzcd1 generated in the auxiliary winding L11 occurs. Then, the induction voltage Vzcd2 applied to the non-inverting input terminal of the comparator 92 is reduced to zero, and becomes lower than the threshold value Vth1. Thereby, the output level of the comparator 92 is changed from High level to Low level (see FIGS. 3C and 3D). The pulse generator 94 detects the falling of the output in the comparator 92, and outputs, to the S2 terminal of the flip-flop 91, the pulse signal P1 having the pulse width Tos1 (see FIG. 3E).

The pulse signal P1 is inputted to the S2 terminal, and thereby the flip-flop 91 changes the voltage level of the control signal S1 from Low level to High level and the switching element Q1 is turned on.

Next, the operation in the case where the switching element Q1 is turned on (an ON period Ton) will be explained. When the switching element Q1 is turned on at a time t0, the inductor current IL flowing through the inductor L1 is increased along a slope determined by an inductance value La of the inductor L1 (see FIG. 3B). At this time, the inductor current IL is detected by the resistor R1 that functions as the current detection section, and the detection voltage Vd is inputted to the non-inverting input terminal of the comparator 93.

Then, the comparator 93 compares the detection voltage Vd with the reference voltage Vref, and changes the output from Low level to High level when the detection voltage Vd exceeds the reference voltage Vref.

Then, the time-delay section 95 outputs, to the R terminal of the flip-flop 91, the output signal S2 which is obtained by means of delaying, by the delay time Td1, a timing of when the output in the comparator 93 is changed from Low level to High level (see FIGS. 3F and 3G). Therefore, the level of the control signal S1 outputted from the flip-flop 91 is changed from High level to Low level, and the switching element Q1 is turned off.

Then, the count section 8 counts the drive period T of the switching element Q1. As shown in FIGS. 3I and 3J, when the switching element Q1 is turned on, the pulse generators 82, 83 generate the pulse signals P2, P3, respectively. As explained above, the pulse width Tos3 of the pulse signal P3 outputted from the pulse generator 83 is shorter than the pulse width Tos2 of the pulse signal P2 outputted from the pulse generator 82. As a result, when the pulse width Tos3 elapses after the switching element Q1 is turned on, the signal (the pulse signal P2) inputted to the S terminal of the flip-flop 81 is changed to High level. Therefore, as shown in FIG. 3K, the output signal S3 in the flip-flop 81 is in Low level during only an output period of the pulse signal P3 (High level period) after the switching element Q1 is turned on.

As shown in FIG. 3L, when the output signal S3 in the flip-flop 81 is in Low level period, because the switching element Q3 is turned on, the capacitor C5 discharges an electrical current via the resistor R8 and switching element Q3, and the capacitor voltage Vc5 is reduced to almost zero

[V]. When the output signal S3 in the flip-flop 81 is in High level period, the switching element Q3 is turned off and the constant current source 85 supplies the constant current to the capacitor C5. Thereby, the capacitor voltage Vc5 is increased gradually along a constant slope. In this way, the count section 8 counts the drive period T from the time when the switching element Q1 is turned on to the time when the switching element Q1 is turned on next, by using the capacitor voltage Vc5.

Then, the capacitor voltage Vc5 is inputted to the non-inverting input terminal of the comparator 84 in order to be compared with the threshold voltage Vth3. That is, the capacitor voltage Vc5 that is a count value of the drive period T calculated by the calculation section 90 is compared with the threshold voltage Vth3 that is set as the upper limit value Tmax of the drive period T. Here, before the capacitor voltage Vc5 reaches the threshold voltage Vth3, the inductor current IL is reduced to zero and the switching element Q1 is turned on. That is, it is determined that the drive period T calculated by the calculation section 90 is shorter than the upper limit value Tmax. Therefore, the capacitor voltage Vc5 is constantly lower than the threshold voltage Vth3, and the output in the comparator 84 is constantly in Low level.

Here, when the power supply device 1 of the present embodiment operates in the critical mode, the specific example will be explained, using the following conditions. The DC voltage Vo1 inputted to the voltage conversion section 3 is set to 400 [V]. The DC electricity Io1 supplied to the load 6 by the voltage conversion section 3 is set to 0.35 [A]. At this time, the DC voltage Vo1 applied to the load 6 is 80 [V]. Further, the upper limit value Tmax of the drive period T set in the count section 8 is set to 20 [µs] (the drive frequency f=50 [kHz]).

Then, when an inductance of the inductor L1 is denoted by La, the ON period Ton and OFF period Toff of the switching element Q1 are obtained by using the following expressions (1) and (2).

$$Ton=Io1*La*2/(Vo1-Vo2)=0.35 [A]*La*2/(400 [V]-80 [V]) \quad (1)$$

$$Toff=Io1*La*2/Vo2=0.35 [A]*La*2/80 [V] \quad (2)$$

Then, when the drive frequency f of the switching element Q1 is set to 50 [kHz], "the inductance La=1830 [µH]" is obtained by using the following expression (3).

$$1/(Ton+Toff)=\text{the drive frequency } f=50 \text{ [kHz]} \quad (3)$$

Next, the present load 6 is exchanged with another load 6 in order to increase the electric power supplied to load. Specifically, the present load 6 is exchanged with another load 6 so that the DC voltage Vo2 becomes 120 [V] when the DC electricity Io1 is 0.35 [A]. In this condition, when the power supply device 1 operates in the critical mode, by calculation similar to the expressions (1), (2) and (3), as the drive frequency f, 65.6 [kHz] is obtained, and as a duty ratio of the switching element Q1, 30 [%] is obtained. That is, the drive frequency f (=1/drive period T) calculated by the calculation section 90 becomes 65.6 [kHz]. Therefore, when the DC power supplied to the load 6 is increased, the drive frequency f calculated by the calculation section 90 is increased, that is, the drive period T becomes shorter than the upper limit value Tmax (20 [µs]=50 [kHz]). As a result, the drive frequency f of the switching element Q1 is set to 65.6 [kHz]. That is, the control section 4 sets the drive period T of the switching element Q1, using the calculation result obtained in the calculation section 90, and the voltage conversion section 3 operates in the critical mode.

Next, the present load 6 is exchanged with yet another load 6 in order to decrease the electric power supplied to load. Specifically, the present load 6 is exchanged with yet another load 6 so that the DC voltage Vo2 becomes 40 [V] when the DC electricity Io1 is 0.35 [A]. In this condition, when the power supply device 1 operates in the critical mode, by calculation similar to the expressions (1), (2) and (3), as the drive frequency f, 28.1 [kHz] is obtained, and as the duty ratio of the switching element Q1, 10 [%] is obtained. That is, the drive frequency f calculated by calculation section 90 becomes 28.1 [kHz]. Therefore, when the DC power supplied to the load 6 is decreased, the drive frequency f calculated by the calculation section 90 is decreased, that is, the drive period T becomes longer than the upper limit value Tmax (20 [µs]=50 [kHz]).

Figure 4:
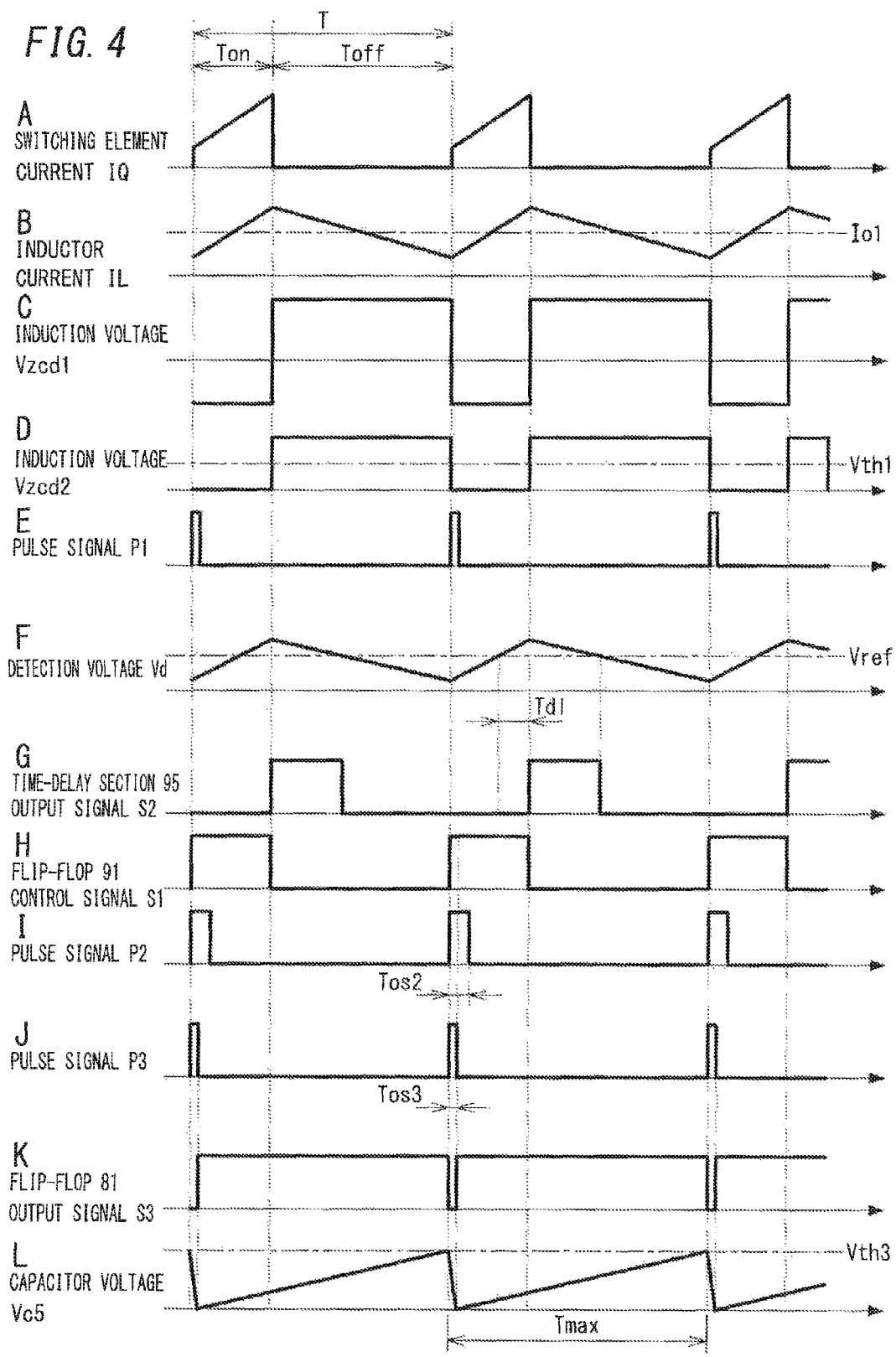
FIGS. 4A to 4L are timing diagrams upon a continuous mode in the power supply device according to the Embodiment 1 of the present invention.

In this case, the control section 4 sets the drive period T of the switching element Q1, using the upper limit value Tmax, and then allows the voltage conversion section 3 to operate in the continuous mode. The case where the voltage conversion section 3 operates in the continuous mode is explained below, using timing diagrams shown in FIGS. 4A-4L. FIG. 4A is a waveform chart of the switching element current IQ flowing through the switching element Q1. FIG. 4B is a waveform chart of the inductor current IL flowing through the inductor L1. FIG. 4C is a waveform chart of the induction voltage Vzcd1 induced in the auxiliary winding L11. FIG. 4D is a waveform chart of the induction voltage Vzcd2 inputted to the non-inverting input terminal of the comparator 92. FIG. 4E is a waveform chart of the pulse signal P1 outputted from the pulse generator 94. FIG. 4F is a waveform chart of the detection voltage Vd inputted to the non-inverting input terminal of the comparator 93. FIG. 4G is a waveform chart of the output signal S2 outputted from the time-delay section 95. FIG. 4H is a waveform chart of the control signal S1 outputted from the flip-flop 91. FIG. 4I is a waveform chart of the pulse signal P2 outputted from the pulse generator 82. FIG. 4J is a waveform chart of the pulse signal P3 outputted from the pulse generator 83. FIG. 4K is a waveform chart of the output signal S3 outputted from the flip-flop 81. FIG. 4L is a waveform chart of the capacitor voltage Vc5 inputted to the non-inverting input terminal of the comparator 84. The operations same as those of the critical mode that have been already explained using FIGS. 3A-3L will not be explained.

As explained above, when the switching element Q1 is turned on, the pulse signal P3 is outputted from the pulse generator 83 into the R terminal of the flip-flop 81. Therefore, the switching element Q3 is turned on during the pulse width Tos3, and the capacitor C5 discharges an electrical current, and the capacitor voltage Vc5 is reduced to almost zero [V]. Then, when the pulse width Tos3 elapses, the switching element Q3 is turned off and the capacitor C5 is charged by the constant current source 85 and the capacitor voltage Vc5 is increased (see FIG. 4L).

When the electric power supplied to the load 6 is large, the drive period T (ON period Ton and OFF period Toff) of the switching element Q1 becomes short. As a result, in the critical mode explained above, before the capacitor voltage Vc5 reaches the threshold voltage Vth3, the current flowing through the inductor L1 is reduced to zero and the switching element Q1 is turned on (see FIG. 3L).

However, here, because the electric power supplied to the load 6 is small, the drive period T (ON period Ton and OFF period Toff) calculated by the calculation section 90 is long. Therefore, before the current flowing through the inductor L1 is reduced to zero, the capacitor voltage Vc5 reaches the threshold voltage Vth3. So, a signal outputted from the comparator 84 into the S1 terminal of the flip-flop 91 is changed from Low level to High level, and the control signal S1 in the flip-flop 91 is changed from Low level to High level. Accordingly, the switching element Q1 is turned on.

That is, when the switching element Q1 is turned on, the count section 8 starts checking time. Then, before the upper limit value Tmax of the drive period T elapses, when the current flowing through the inductor L1 is not reduced to zero and the switching element Q1 is not turned on, the switching element Q1 is turned on forcibly. In this way, the drive period T of the switching element Q1 is set by the upper limit value Tmax, and the voltage conversion section 3 operates in the continuous mode.

In this way, in the present embodiment, when the electric power supplied to the load 6 is large, the drive period T of the switching element Q1 is set so as to become shorter than the upper limit value Tmax, and the voltage conversion section 3 operates in the critical mode. Then, drive period T of the switching element Q1 is set so as to become longer with decreasing the electric power supplied to the load 6. Then, when the drive period T reaches the upper limit value Tmax, the drive period T is set by the upper limit value Tmax. Then, even when the electric power supplied to the load 6 is further decreased, the drive period T of the switching element Q1 is fixed at the upper limit value Tmax, and the voltage conversion section 3 operates in the continuous mode. Therefore, even when the electric power supplied to the load 6 is small, the power supply device 1 of the present embodiment can prevent the drive period T of the switching element Q1 from exceeding the upper limit value Tmax.

For example, the upper limit value Tmax of the drive period T can be changed from 20 [μs] (the drive frequency f=50 [kHz]) to 25 [μs] (the drive frequency f=40 [kHz]). Thereby, the power supply device 1 can prevent the drive frequency f of the switching element Q1 from interfering in frequency bands used in an infrared remote control. Also, the power supply device 1 can prevent the drive frequency f from being in the zone of audibility, and thereby generation of the noise can be prevented.

Further, the upper limit value Tmax of the drive period T can be set to a desired value, by adjusting at least any one of the pulse widths Tos2 and Tos3, the amount of current in the constant current source 85, the capacity of the capacitor C5, and the threshold voltage Vth3.

Further, when the electric power supplied to the load 6 is small, the voltage conversion section 3 operates in the continuous mode, and therefore, the switching loss of the switching element Q1 is increased, and the noise generated upon turning on the switching element is increased. However, on the other hand, because the electric power supplied to the load 6 is small, the power supply device 1 can improve significantly the loss generated in the DC power supply section 2, and a total consumed power in the power supply device 1 can be reduced significantly. Further, the power supply device 1 can minimize an increase in the noise generated from the entire region, by reducing the noise generated in the DC power supply section 2.

Further, in the present embodiment, by adopting the time-delay section 95 as shown in FIG. 2, the stable delay time Td1 can be set regardless of a level of the detection voltage Vd. In addition, the delay time Td1 can be shortened (for example, less than or equal to 100 [ns]), and a minimal ON period of the switching element Q1 can be shortened. Thereby, a dimming range of the load 6 (the light-emitting diode 61) can be enlarged.

For example, a load 6 that turns on a lamp with ratings is connected to the power supply device 1, and when the DC electricity Io1 of 0.35 [A] is supplied, the DC voltage Vo1 becomes 80 [V]. Then, assuming that the DC voltage Vo1 keeps constant at 80 [V] even if the DC electricity Io1 is reduced, "ON period Ton=110 [ns]" is obtained by using the above expression (1) in the case where the DC electricity Io1 is set to 0.010 [A]. Assuming that the current ratio is equal to the dimming ratio, "0.010 [A]/0.35 [A]*100=3 [%]" is obtained. That is, the power supply device 1 of the present embodiment is provided with the time-delay section 95 that has the above configuration, and therefore can reduce the dimming ratio of the load 6 stably to almost 3 [%].

The pulse generator 94 may be configured similar to the time-delay section 95 shown in FIG. 2. In this case, the pulse generator 94 can delay the timing of when the switching element Q1 is turned on, by adjusting the delay time, and therefore, the voltage conversion section 3 can be operated in the intermittent mode.

Figure 5:
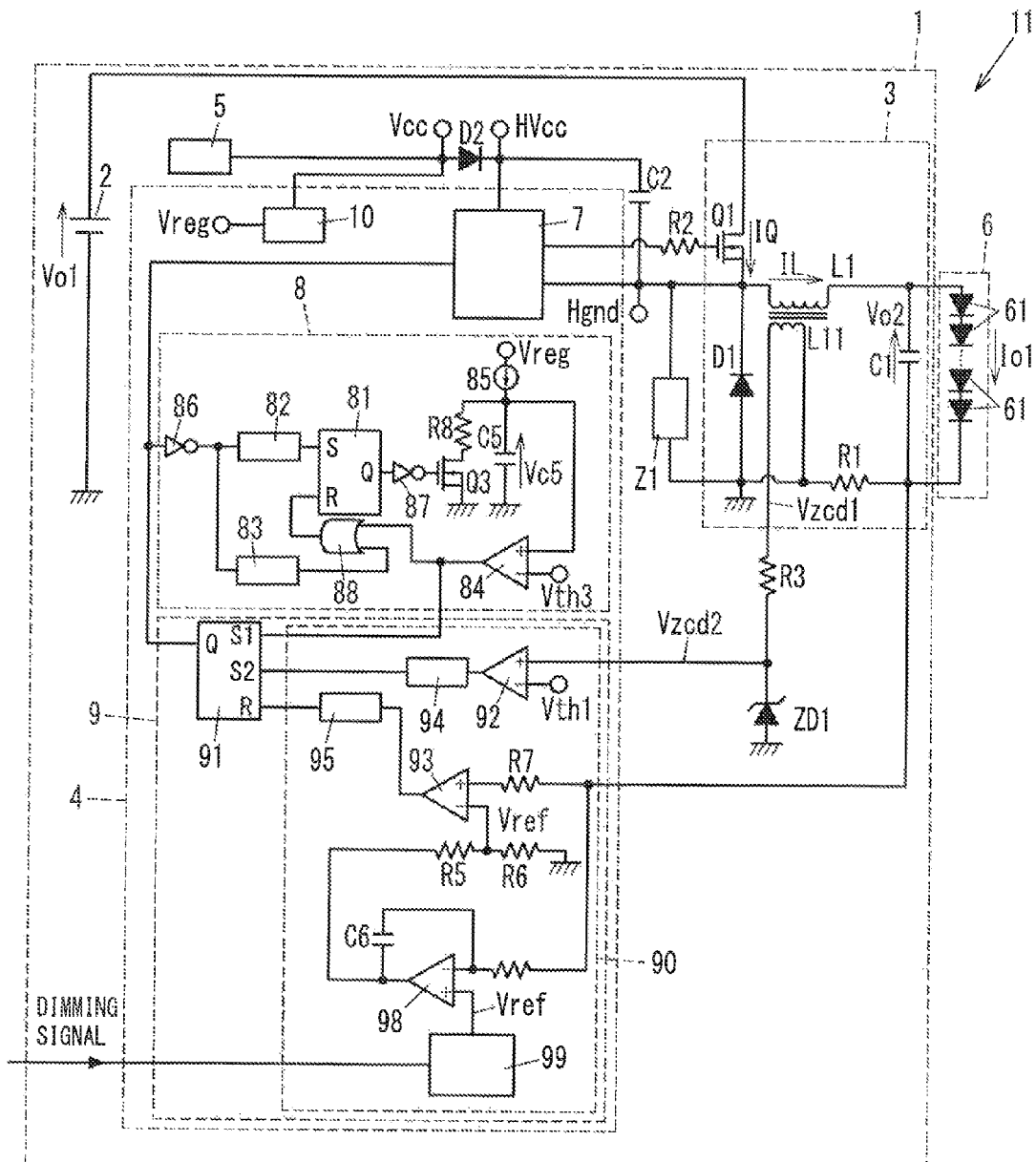
FIG. 5 is a circuit configuration diagram of the power supply device provided with a dimming level generator according to the Embodiment 1 of the present invention.

Further, as shown in FIG. 1, the reference voltage Vref is generated using the error amplifier 96, capacitor C3 and operational amplifier 97, but the circuit for generating the reference voltage Vref is not limited to this configuration. As shown in FIG. 5, the circuit for generating the reference voltage Vref may be configured so as to perform the integration operator using an operational amplifier 98 and a capacitor C6.

Further, fixing the threshold voltage Vth2 for determining the DC electricity Io1 supplied to the load 6 is not required. As shown in FIG. 5, the power supply device 1 may be provided with a dimming level generator 99 that determines a threshold value based on a dimming signal inputted from the outside.

Also, the count section 8 is not limited to the above configuration, as long as the count section 8 is configured to set the upper limit value Tmax of the drive period T and to compare the upper limit value Tmax with the drive period T that has been calculated by the calculation section 90.

A lighting device 11 of the present embodiment is constituted by the load 6 that includes a plurality of light-emitting diodes 61 and the power supply device 1 that supplies the DC electricity Io1 to the load 6, but is not limited to such a configuration. For example, the load 6 may include a rechargeable battery, and the rechargeable battery may be recharged with the DC electricity Io1 supplied by the power supply device 1.

(Embodiment 2)

Figure 6:
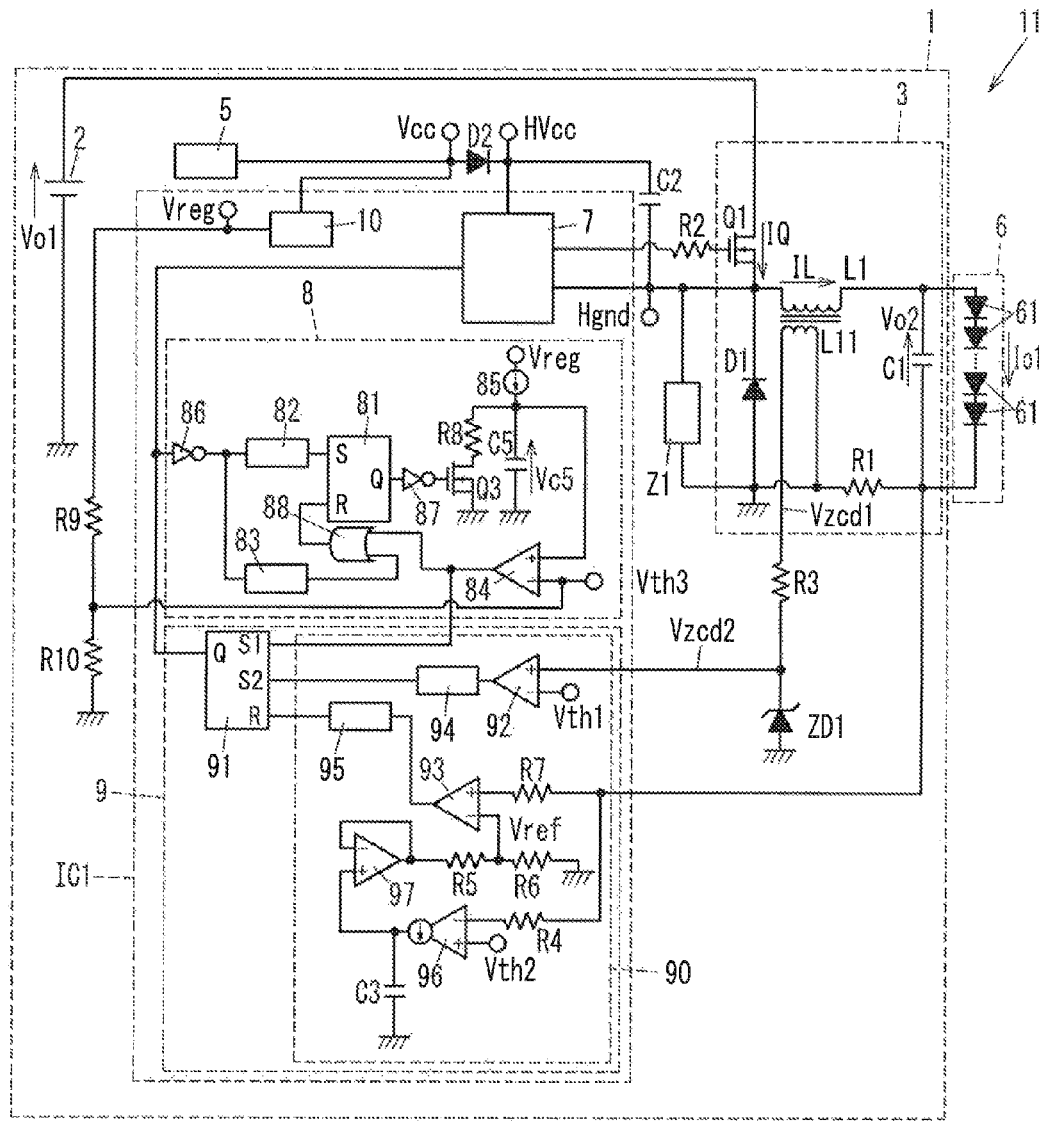
FIG. 6 is a circuit configuration diagram of a power supply device according to Embodiment 2 of the present invention.

FIG. 6 shows a circuit configuration of a power supply device 1 according to the present embodiment.

In the present embodiment, a plurality of resistors (resistors R9 and R10 in Figures) divides the reference power Vreg generated by the reference supply section 10, thereby generating the threshold voltage Vth3. The constituent elements same as those of the Embodiment 1 are assigned with same reference numerals and the explanation thereof is omitted.

By adjusting a resistance ratio between the resistors R9 and R10, the threshold voltage Vth3 that is applied to the inverting input terminal of the comparator 84 in the count section 8 can be adjusted. Therefore, the upper limit value Tmax of the drive period T can be set to a desired value. For example, if the upper limit value Tmax of the drive period T is set to a sufficiently-large value, the voltage conversion section 3 can be operated consistently in the critical mode.

Further, even if the inductor L1 is not provided with the auxiliary winding L11, the drive period T is set by the upper limit value Tmax and the control section 4 can allow the voltage conversion section 3 to operate in the continuous mode or intermittent mode. In this case, because the auxiliary winding L11 of the inductor L1 can be omitted, the cost can be reduced.

Accordingly, the operating mode in the voltage conversion section 3 can be selected appropriately among the critical mode, continuous mode, or intermittent mode, using one control section 4.

Further, in the present embodiment, an integrated circuit IC1 is constituted by the count section 8 and the signal generation section 9. As a result, the number of components can be reduced and the power supply device 1 can be downsized.

(Embodiment 3)

Figure 7:
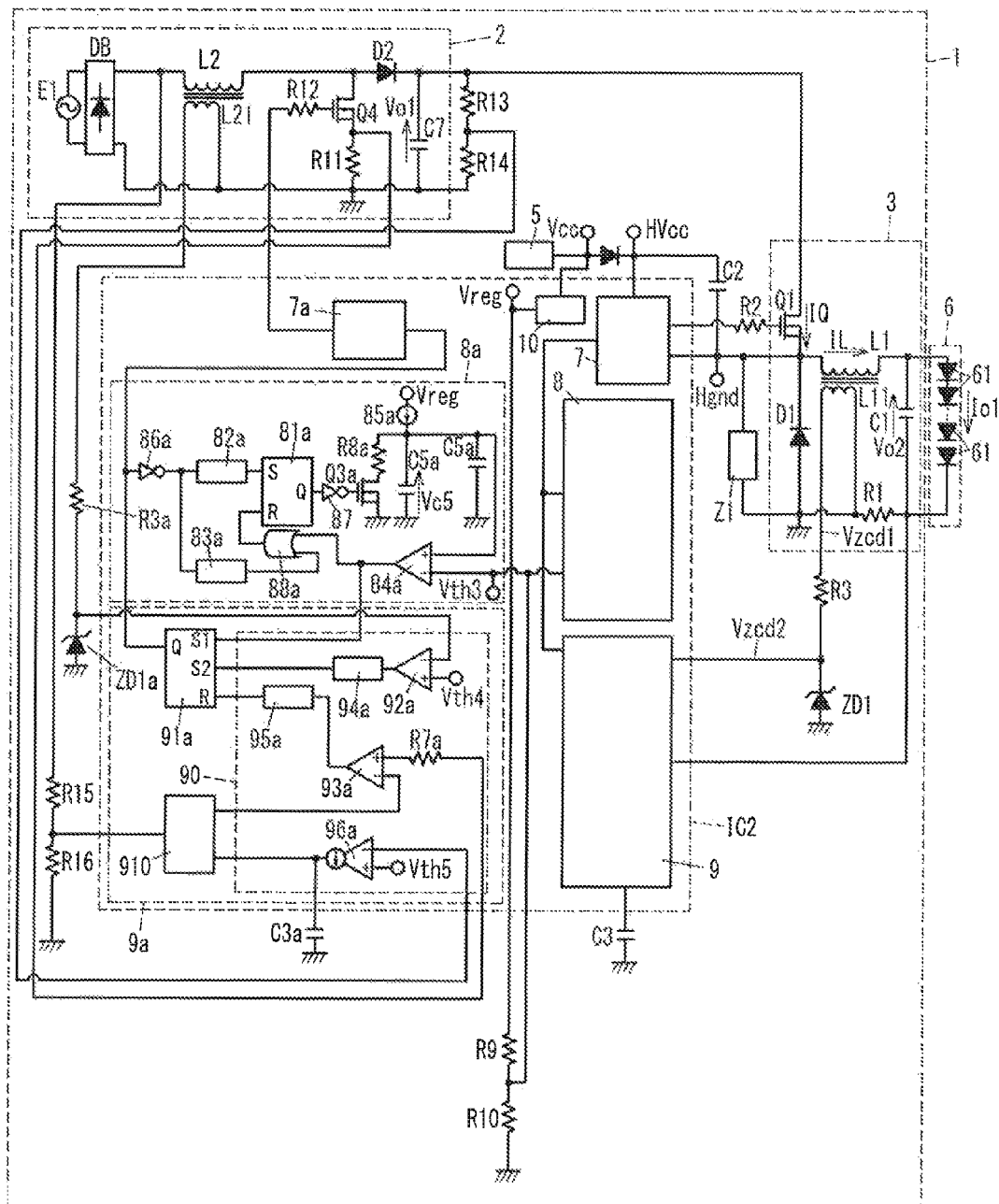
FIG. 7 is a circuit configuration diagram of a power supply device according to Embodiment 3 of the present invention.

FIG. 7 shows a circuit configuration of a power supply device 1 according to the present embodiment.

In the present embodiment, the DC power supply section 2 includes a rectifier DB and a boost chopper circuit, and the control section 4 controls the DC power supply section 2. The constituent elements same as those of the Embodiment 1 are assigned with same reference numerals and the explanation thereof is omitted.

The above boost chopper circuit includes an inductor L2, a switching element Q4, a diode D3, a smoothing capacitor C7 and a resistor R11. The rectifier DB is connected to an AC source E1, and performs the full wave rectification to an AC voltage that is outputted from the AC source E1, and then supplies the rectified current to the subsequent boost chopper circuit. A series circuit of the inductor L2, switching element Q4 and resistor R11 is connected between output terminals of the rectifier DB. Further, a series circuit of the diode D3 and smoothing capacitor C7 is connected in parallel to a series circuit of the switching element Q4 and resistor R11. A gate of the switching element Q4 is connected to the control section 4 via the resistor R12. Then, the control section 4 performs ON/OFF drive of the switching element Q4, thereby generating the DC voltage Vo1 across the smoothing capacitor C7.

The control section 4 changes a drive period of the switching element Q4 in response to the electric power supplied to the voltage conversion section 3 by the DC power supply section 2 so as to keep the DC voltage Vo1 constant. So, the control section 4 is provided with a drive section 7a, a count section 8a and a signal generation section 9a in order to operate in the continuous mode so that the drive period of the switching element Q4 does not exceed an upper limit value. The basic constituent elements of the drive section 7a, count section 8a and signal generation section 9a are the same as those of the drive section 7, count section 8 and signal generation section 9 that have been explained in the Embodiment 1, respectively. Therefore, in regard to the same constituent elements, "a" is added at the foot of the reference numeral and the explanation thereof is omitted, and then only the different constituent elements will be explained below.

The signal generation section 9a includes a multiplier 910, instead of the operational amplifier 97 and resistors R5 and R6 in the signal generation section 9. A series circuit of the resistors R13 and R14 connected in parallel to the capacitor C7 divides the DC voltage Vo1 and inputs the divided voltage into a non-inverting input terminal of an error amplifier 96a in the signal generation section 9a. Then, the divided voltage value is compared with the threshold voltage Vth2a and, based on the comparison result a voltage across the capacitor C3a is inputted to the multiplier 910. Further, the resistors R15 and R16 divide an undulating voltage outputted from the rectifier DB, and the divided voltage is inputted to the multiplier 910. The multiplier 910 generates the reference voltage Vref that is used for determining the timing of when the switching element Q4 is turned off, based on the voltage across the capacitor C3a and the undulating voltage outputted from the rectifier DB, and then outputs the reference voltage Vref to an inverting input terminal of the comparator 93a.

Then, like the Embodiment 2, the resistors R9 and R10 divide the reference supply Vreg generated by the reference supply section 10, thereby generating the threshold voltage Vth3 inputted to the comparator 84 of the count section 8. The threshold voltage Vth3 is inputted to also a comparator 84a of the count section 8a. The count section 8a is provided with two capacitors C5a which are connected in parallel, thereby having twice the condenser capacity of the count section 8. Therefore, a slope along which a capacitor voltage Vc5a is increased is changed to ½. In this case, the capacity of the capacitor C5a is equal to that of the capacitor C5, and the current value outputted from the constant current source 85a is equal to that of the constant current source 85. Accordingly, an upper limit value of a drive period Ta of the switching element Q4 that is set in the count section 8a becomes twice the upper limit value Tmax of the drive period T of the switching element Q1 that is set in the count section 8. For example, when a lower limit value of the drive frequency f that is set in the count section 8 is 44 [kHz], a lower limit value of the drive frequency fa that is set in the count section 8a is 22 [kHz].

In the DC power supply section 2 having the above configuration, the drive period Ta of the switching element Q4 becomes longer with an increase in the supply power. Then, when the supply power is large, the DC power supply section 2 operates in the continuous mode. When the supply power is small, the DC power supply section 2 operates in the critical mode.

Therefore, when the voltage (the DC voltage Vo1) in the load 6 is high, that is, when the electric power supplied to load 6 is large, the voltage conversion section 3 operates in the critical mode and DC power supply section 2 operates in the continuous mode. Meanwhile, when the voltage (the DC voltage Vo1) in the load 6 is low, that is, when the electric power supplied to load 6 is small, the voltage conversion section 3 operates in the continuous mode and the DC power supply section 2 operates in the critical mode.

In this way, in the present embodiment, even when the control is performed through combining the boost chopper circuit and the step-down chopper circuit, the power supply device 1 can prevent both of the boost chopper circuit and the step-down chopper circuit from operating in the continuous mode at the same time. Thereby, the power supply device 1 can minimize the total increased amount of the switching losses of the switching elements Q1 and Q4, and can minimize also the total increased amount of the noises generated from the switching elements Q1 and Q4.

Further, like the Embodiment 2, the control section 4 is constituted by an integrated circuit IC2, and thereby, the number of components can be reduced and the power supply device 1 can be downsized.

Figure 8:
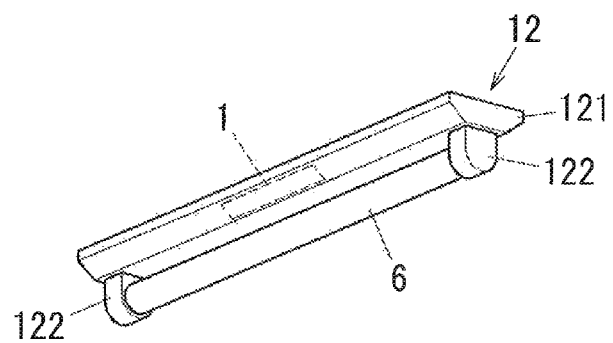
FIG. 8 is an appearance diagram of a lighting fixture using the power supply device according to the Embodiment 3 of the present invention.
Figure 9:
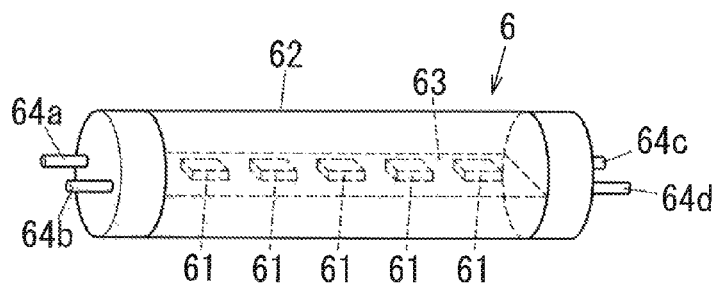
FIG. 9 is an appearance diagram of a load provided in the lighting fixture using the power supply device according to the Embodiment 3 of the present invention.
Figure 10:
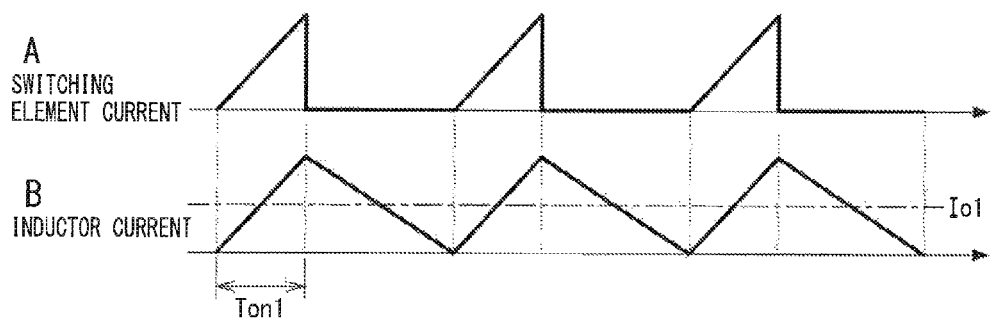
FIGS. 10A and 10B are timing diagrams upon a critical mode in the conventional power supply device.
Figure 11:
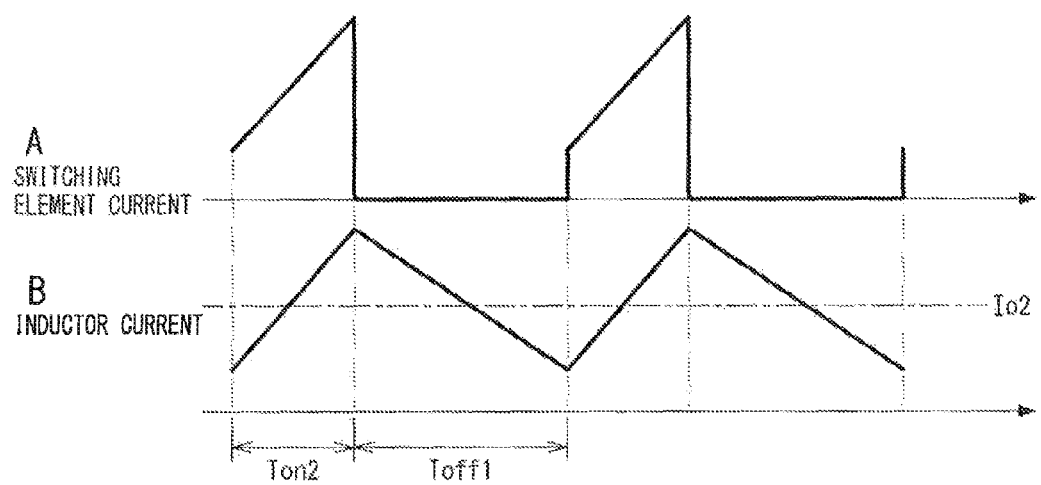
FIGS. 11A and 11B are timing diagrams upon a continuous mode in the conventional power supply device.

Next, FIG. 8 is an appearance diagram of a lighting fixture 12 using the power supply device 1 according to the present embodiment. As shown in FIG. 9, the load 6 includes a housing 62 of a straight pipe type that has the same shape as a fluorescent lamp, a substrate 63 that is housed in the housing 62, and a plurality of light-emitting diodes 61 that are mounted on the substrate 63. A pair of electrodes 64a, 64b is located at one end of the housing 62, and a pair of electrodes 64c, 64d is located at the other end of the housing 62.

The power supply device 1 is stored in a main body 121. The main body 121 is provided with a pair of lamp holders 122 functioning as output terminals of the power supply device 1. The electrodes 64a, 64b (a connecting portion) of the load 6 are attached detachably to one lamp holder 122, and the electrodes 64c, 64d (a connecting portion) of the load 6 are attached detachably to the other lamp holder 122. In this way, when the electrodes 64*a*-64*d* of the load 6 are attached to the lamp holders 122, the DC electricity Io1 is supplied from the power supply device 1 to light-emitting diodes 61, and the light-emitting diodes 61 light up.

In this way, the load 6 is configured so as to be attached detachably to the main body 121, and thereby, even if efficiency of a light-emitting diode is improved in the future, energy conservation can be achieved by exchanging only the load 6 with a new load including such a light-emitting diode.

Further, in the present embodiment, because the DC electricity Io1 supplied to the load 6 is controlled so as to keep constant, even if the load 6 is exchanged with a load of which a forward voltage of a light-emitting diode is different from that of the load 6, the dimming does not change.

Although the present invention has been described with reference to certain preferred embodiments, numerous modifications and variations can be made by those skilled in the art without departing from the true spirit and scope of this invention, namely claims.

The invention claimed is:

1. A power supply device, comprising:
   a DC power supply section that outputs a DC voltage;
   a voltage conversion section that is provided with a switching element, an inductor and a capacitor, and supplies a DC power to a load by ON/OFF drive of the switching element, using the DC power supply section as an input power source;
   a current detection section that detects a current flowing through the load;
   a control section that performs the ON/OFF drive of the switching element based on a detection result obtained in the current detection section so that a DC electricity supplied from the voltage conversion section to the load is maintained constant; and
   an energy detection section that detects energy which is released by the inductor,
   wherein the control section comprises a calculation section that calculates a drive period of the switching element according to increase or decrease of the DC power supplied to the load, and a period comparator that compares a calculation result obtained in the calculation section with an upper limit value of the drive period of the switching element,
   wherein when the drive period of the switching element calculated by the calculation section is shorter than the upper limit value, the control section is configured to set the drive period of the switching element, using the calculation result obtained in the calculation section, and to turn on the switching element with a timing of when the energy released by the inductor is reduced to zero, and
   wherein when the drive period of the switching element calculated by the calculation section is longer than the upper limit value, the control section is configured to set the drive period of the switching element, using the upper limit value.

2. The power supply device according to claim 1, wherein the calculation result obtained in the calculation section is adjusted so that the drive period of the switching element is lengthened with decreasing the DC power supplied to the load.

3. A lighting device comprising:
   the power supply device according to claim 1; and
   a load to which the power supply device supplies a DC power,
   wherein the load comprises a plurality of light-emitting diodes which are connected in series or parallel, and is provided with a connecting portion which is detachably attached to an output terminal of the power supply device, and lights up by receiving the DC power from the power supply device.

4. A lighting device comprising:
   the power supply device according to claim 2; and
   a load to which the power supply device supplies a DC power,
   wherein the load comprises a plurality of light-emitting diodes which are connected in series or parallel, and is provided with a connecting portion which is detachably attached to an output terminal of the power supply device, and lights up by receiving the DC power from the power supply device.

5. A lighting fixture comprising: the lighting device according to claim 3; and a main body to which the lighting device is attached.

6. A lighting fixture comprising: the lighting device according to claim 4; and a main body to which the lighting device is attached.

* * * * *